US012548937B2

(12) United States Patent
Hsu et al.

(10) Patent No.: US 12,548,937 B2
(45) Date of Patent: Feb. 10, 2026

(54) ELECTRICAL CONNECTOR ASSEMBLY HAVING DIFFERENTIAL PAIR CONTACT MODULES AND A SIDEBAND CONTACT MODULE ASSEMBLED TO THE DIFFERENTIAL PAIR CONTACT MODULES

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Chun-Hsiung Hsu, New Taipei (TW); Yi-Min Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 314 days.

(21) Appl. No.: 18/211,764

(22) Filed: Jun. 20, 2023

(65) Prior Publication Data

US 2023/0420882 A1 Dec. 28, 2023

(30) Foreign Application Priority Data

Jun. 25, 2022 (CN) ......................... 202210731741.1

(51) Int. Cl.

| | |
|---|---|
| ***H01R 13/514*** | (2006.01) |
| ***H01R 13/405*** | (2006.01) |
| ***H01R 13/6597*** | (2011.01) |

(52) U.S. Cl.

CPC ......... *H01R 13/514* (2013.01); *H01R 13/405* (2013.01); *H01R 13/6597* (2013.01)

(58) Field of Classification Search

CPC ................ H01R 13/502; H01R 13/514; H01R 13/6585; H01R 13/6587; H01R 13/6597

See application file for complete search history.

(56) References Cited

U.S. PATENT DOCUMENTS

| | | | | |
|---|---|---|---|---|
| 10,367,308 | B2 | 7/2019 | Little et al. | |
| 10,559,930 | B2 | 2/2020 | Little | |
| 2017/0006733 | A1* | 1/2017 | Gregori | H01R 12/00 |
| 2020/0274267 | A1 | 8/2020 | Zerebilov et al. | |
| 2020/0280142 | A1* | 9/2020 | Hung | H01R 9/24 |
| 2020/0358227 | A1 | 11/2020 | Henry et al. | |
| 2021/0351536 | A1 | 11/2021 | Chung et al. | |
| 2021/0351547 | A1 | 11/2021 | Little et al. | |
| 2022/0173555 | A1 | 6/2022 | Little | |
| 2023/0369800 | A1* | 11/2023 | Wolfe | H01R 13/514 |

* cited by examiner

*Primary Examiner* — Oscar C Jimenez

(74) *Attorney, Agent, or Firm* — Ming Chieh Chang

(57) ABSTRACT

An electrical connector assembly includes: an insulative housing forming a front mating slot and a rear receiving space; a contact module received in the insulative housing and including an upper part and a lower part stacked with each other, each of the upper part and the lower part including a differential pair contact module having an insulator and a plurality of differential pair contact fixed in the insulator, each of the differential pair contact having a mating portion and a tail portion opposite to the mating portion; and a sideband contact module comprising sideband contacts, wherein the differential pair contacts and the sideband contacts are fixed to the insulator in different ways.

16 Claims, 16 Drawing Sheets

ELECTRICAL CONNECTOR ASSEMBLY HAVING DIFFERENTIAL PAIR CONTACT MODULES AND A SIDEBAND CONTACT MODULE ASSEMBLED TO THE DIFFERENTIAL PAIR CONTACT MODULES

BACKGROUND OF THE INVENTION

Field of the Invention

The present invention relates generally to an electrical connector assembly, particularly to a contact module structure of the electrical connector assembly having a high-speed contact module and a sideband contact module.

Description of Related Arts

U.S. Patent Application Publication No. 20210351547 discloses an electrical connector assembly including an insulative housing and a high-speed contact module and a sideband contact module received in the insulative housing. The high-speed contact module and the sideband contact module are separated and then assembled in the insulative housing respectively, which is cumbersome and complicated to assemble.

An improved electrical connector assembly is desired.

SUMMARY OF THE INVENTION

The objective of the present invention is to provide an electrical connector assembly with a firmer and more stable structure which is convenient to assemble.

To achieve the above-mentioned object, an electrical connector assembly comprises: an insulative housing forming a front mating slot and a rear receiving space; a contact module received in the insulative housing and including an upper part and a lower part stacked with each other, each of the upper part and the lower part comprising a differential pair contact module having an insulator and a plurality of differential pair contact fixed in the insulator, each of the differential pair contact having a mating portion and a tail portion opposite to the mating portion; and a sideband contact module comprising sideband contacts, wherein the differential pair contacts and the sideband contacts are fixed to the insulator in different ways.

Compared to prior art, in the electrical connector assembly of the present invention, the differential pair contacts and the sideband contacts are fixed to the insulator in different ways, which makes the assembly convenient for production and manufacture and the structure firm and stable.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
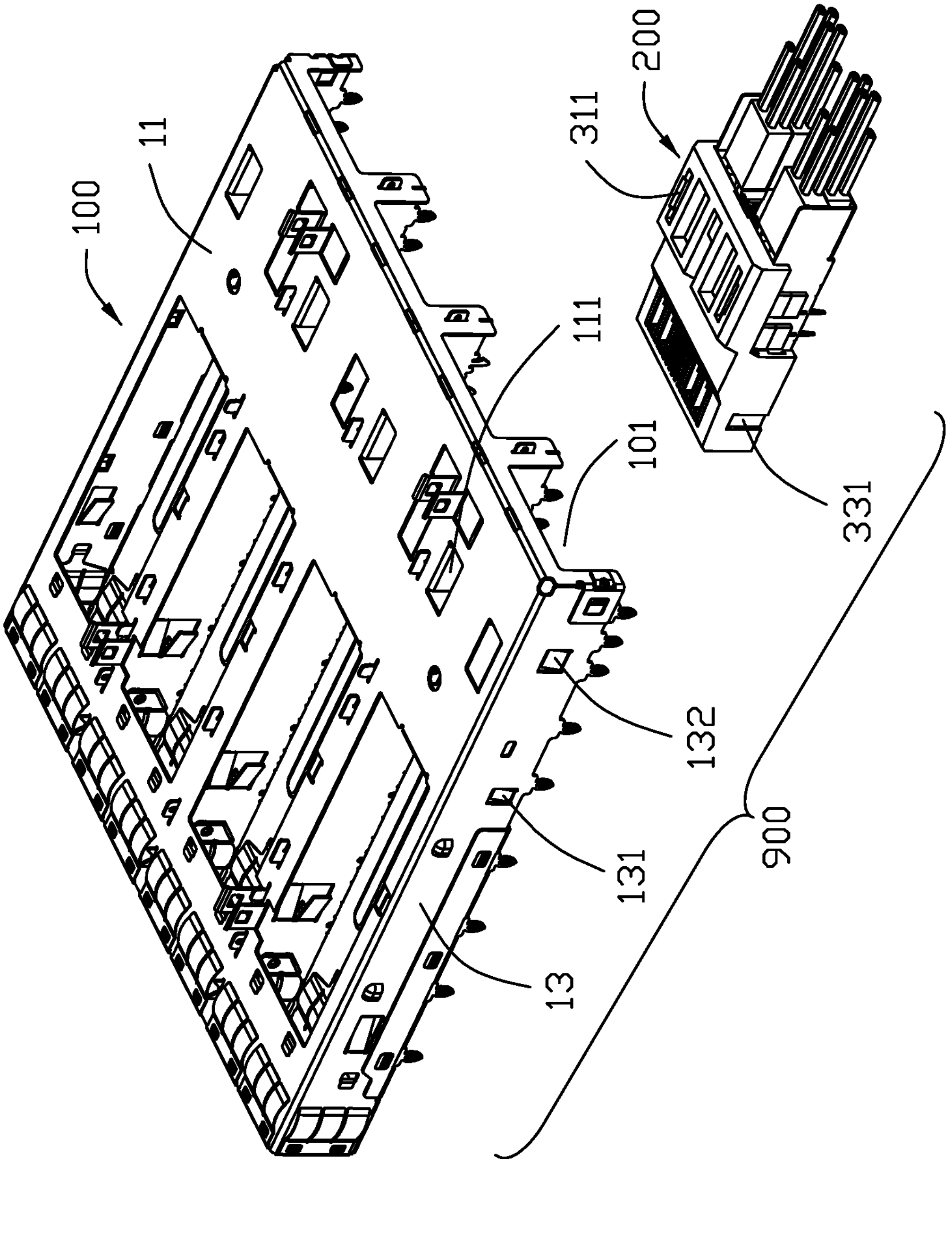
FIG. 1 is a perspective view of a receptacle assembly in accordance with the present invention.
Figure 2:
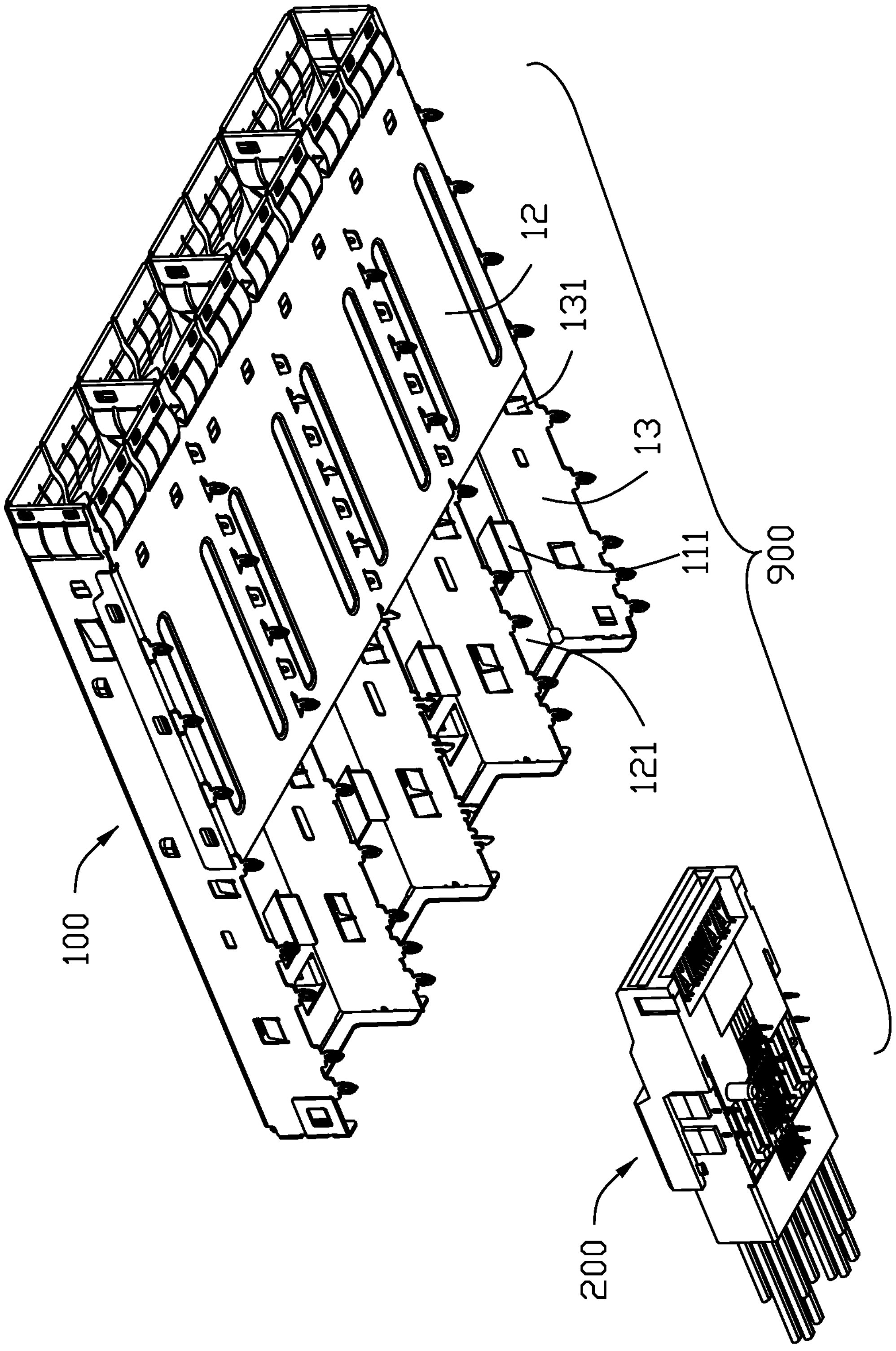
FIG. 2 is another perspective view of the receptacle assembly in FIG. 1.
Figure 3:
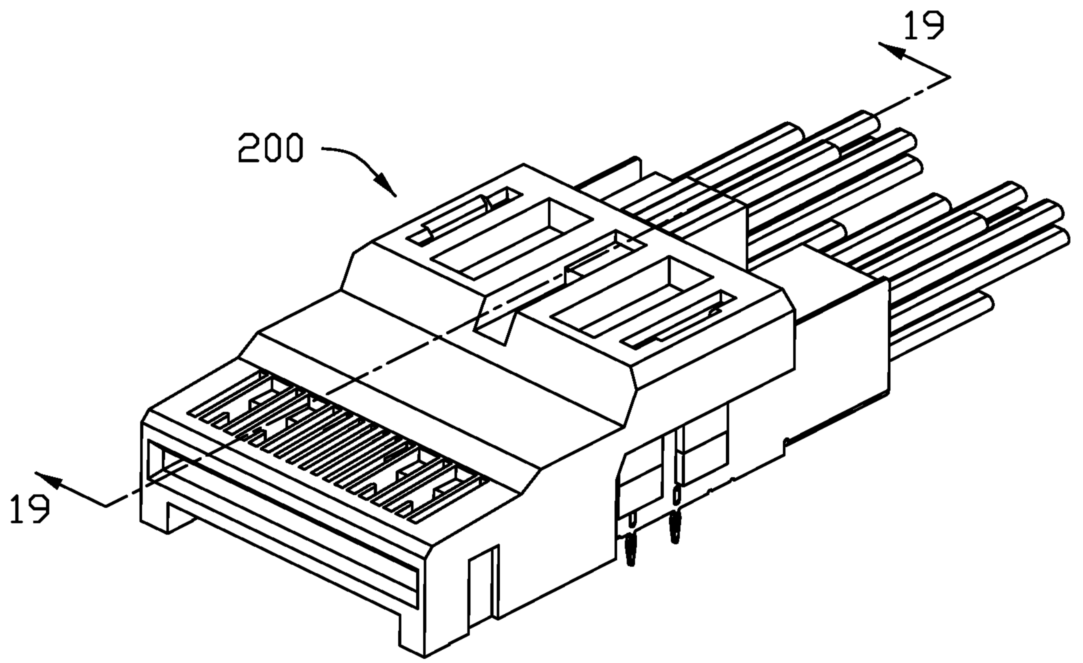
FIG. 3 is a perspective view of an electrical connector assembly of the receptacle assembly in FIG. 1.
Figure 4:
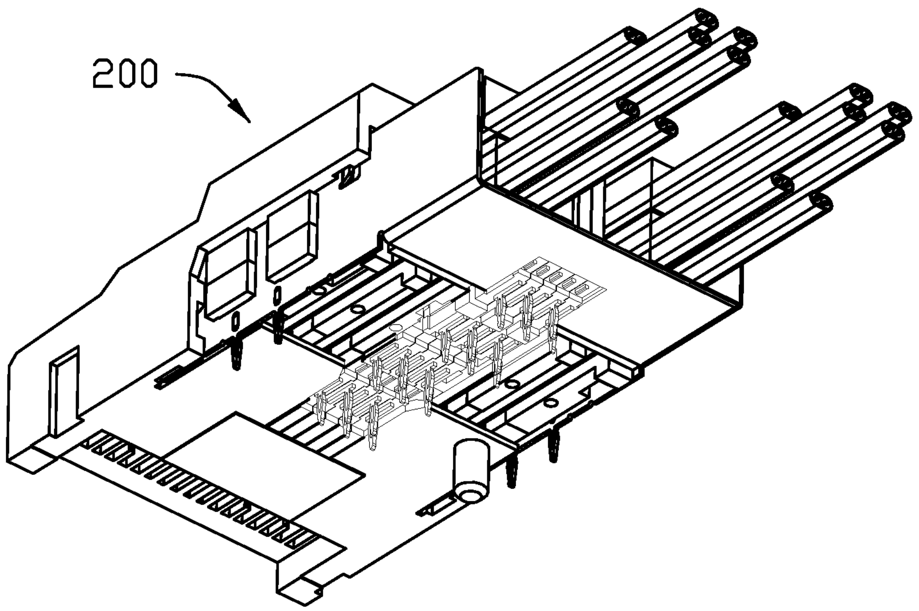
FIG. 4 is another perspective view of the electrical connector assembly in FIG. 3.
Figure 5:
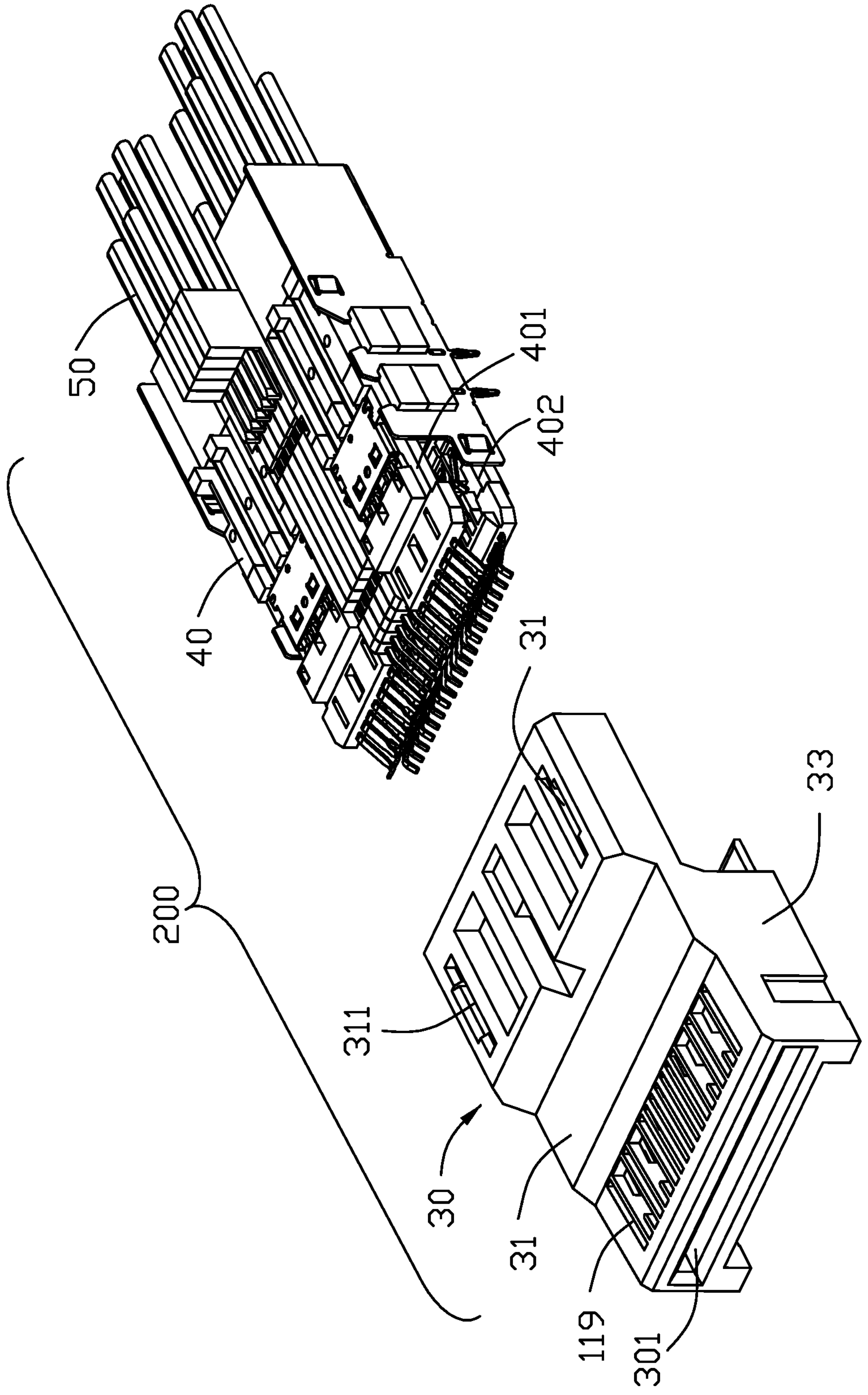
FIG. 5 is an exploded view of the electrical connector assembly in FIG. 3.
Figure 6:
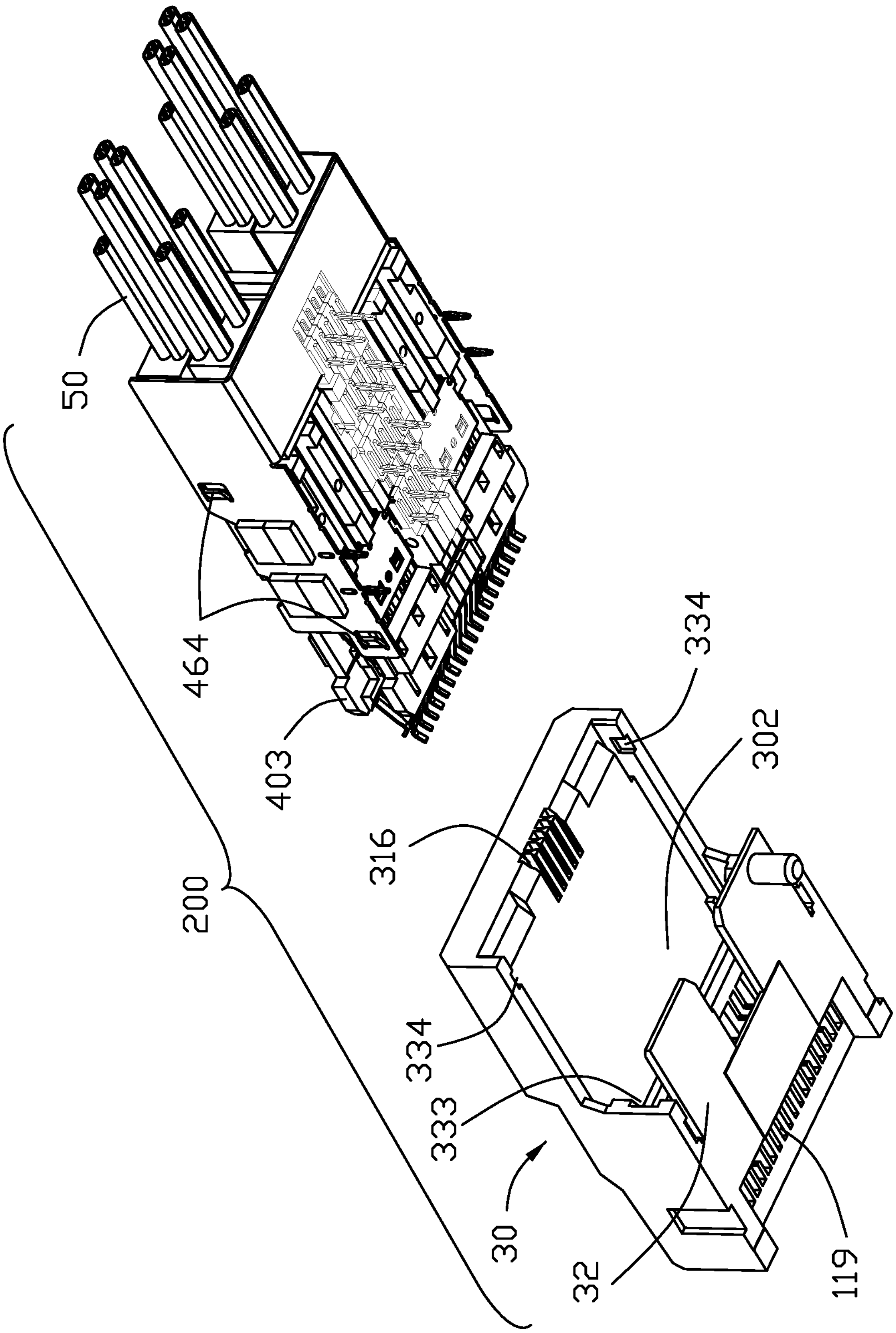
FIG. 6 is a another exploded view of the electrical connector assembly in FIG. 5.
Figure 7:
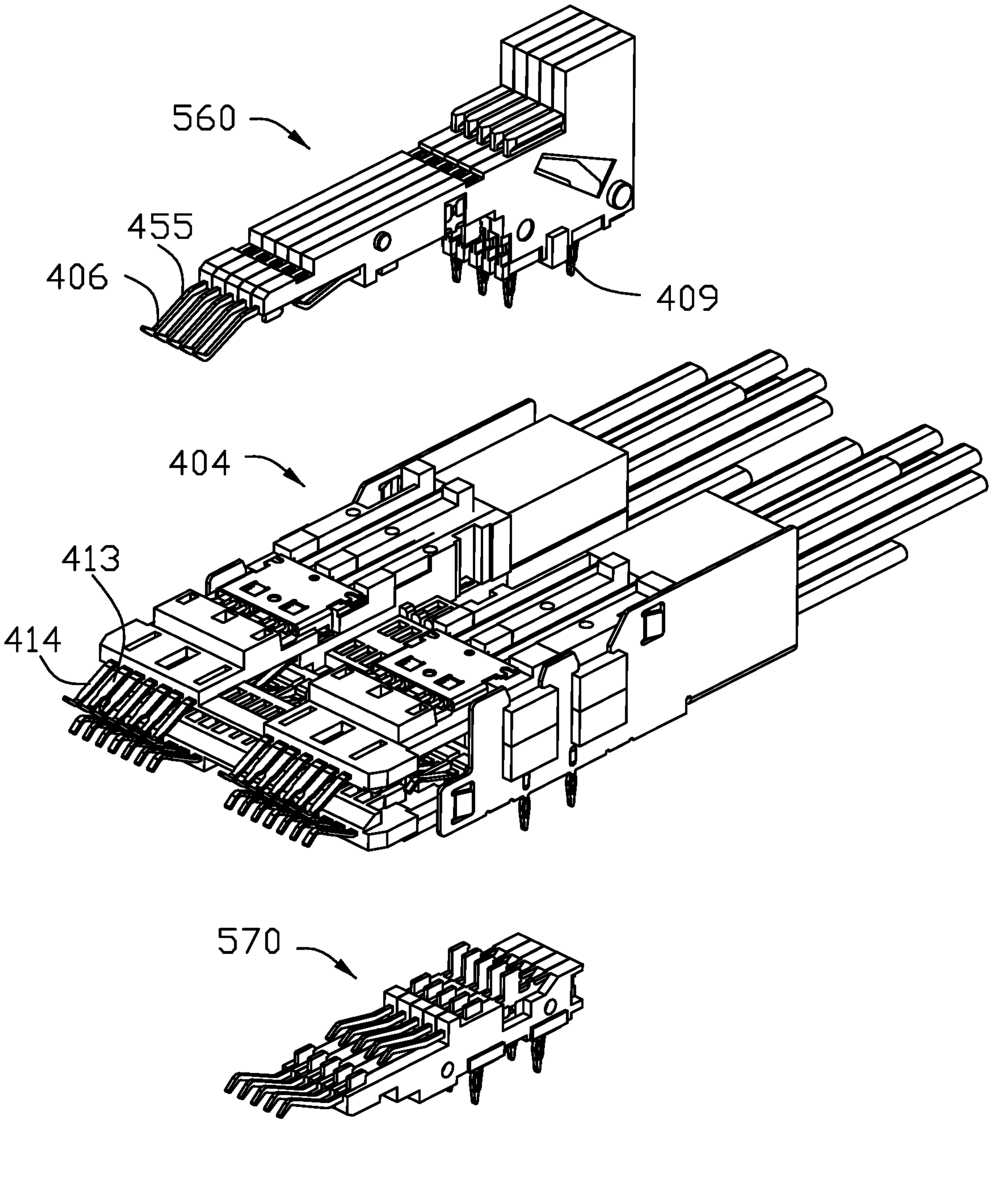
FIG. 7 is an exploded view of a contact module of the electrical connector assembly in FIG. 3.
Figure 8:
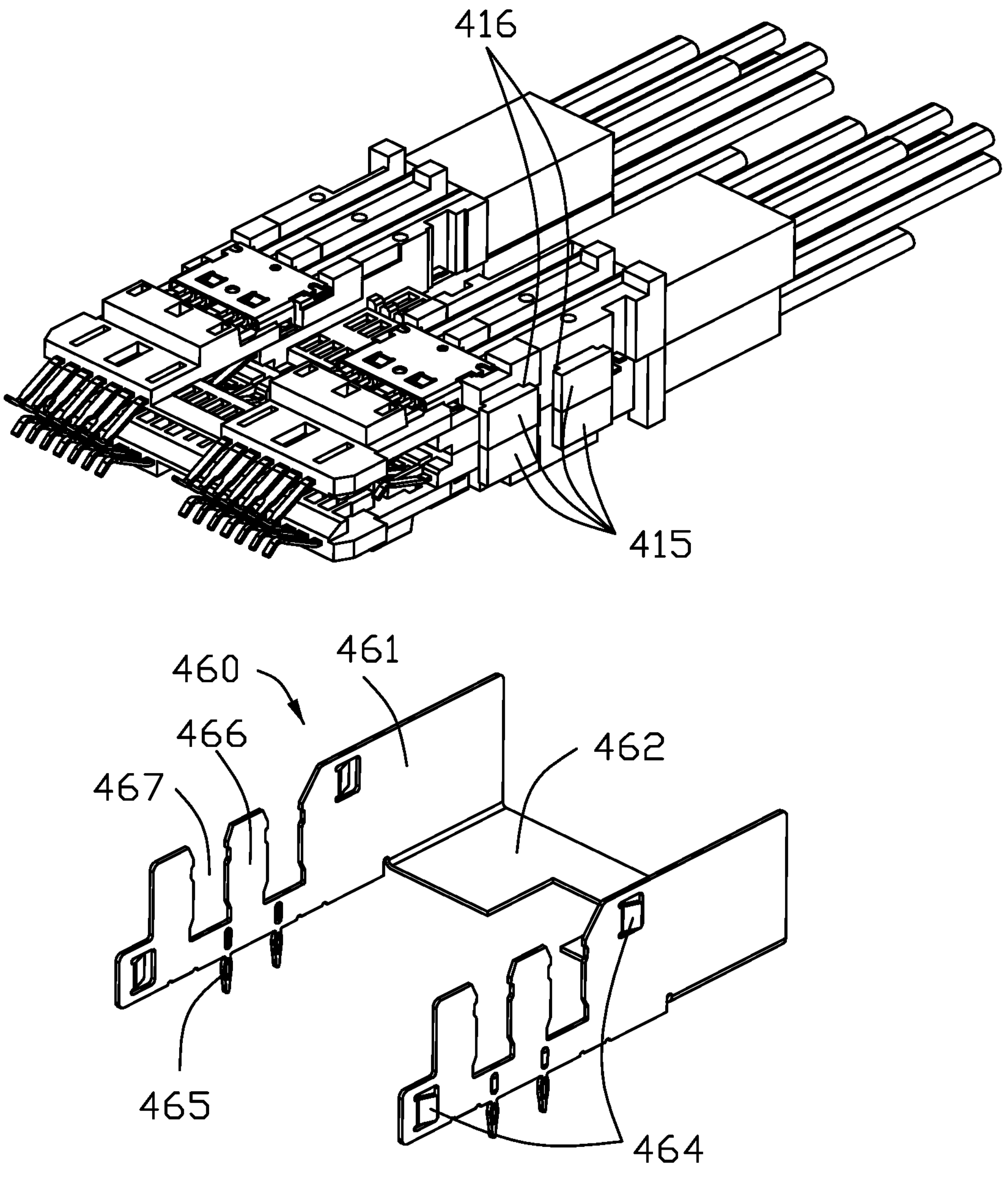
FIG. 8 is an exploded view of contact module in FIG. 7 removing the sideband contact module.
Figure 9:
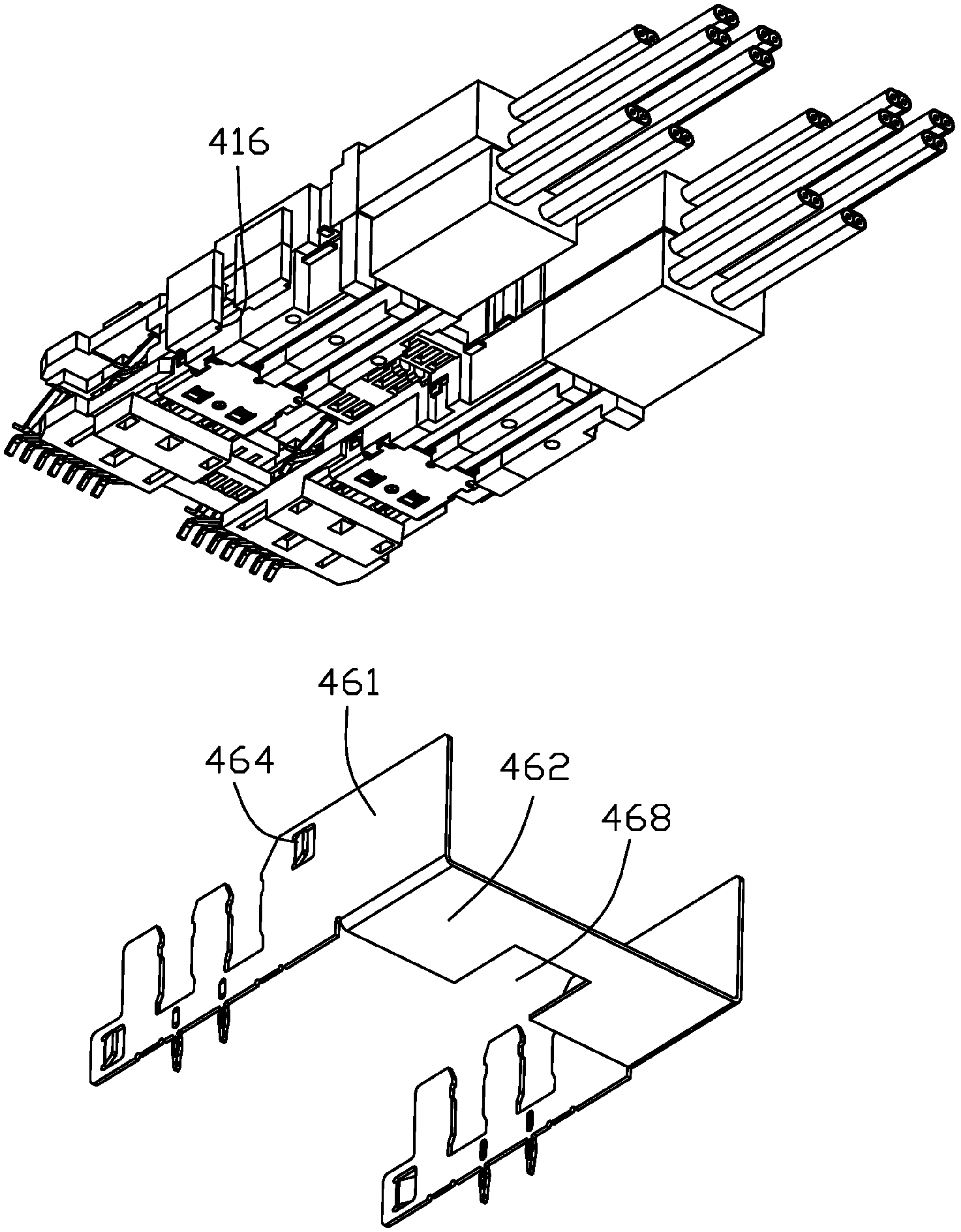
FIG. 9 is another perspective view of the contact module in FIG. 7 removing the sideband contact module.
Figure 10:
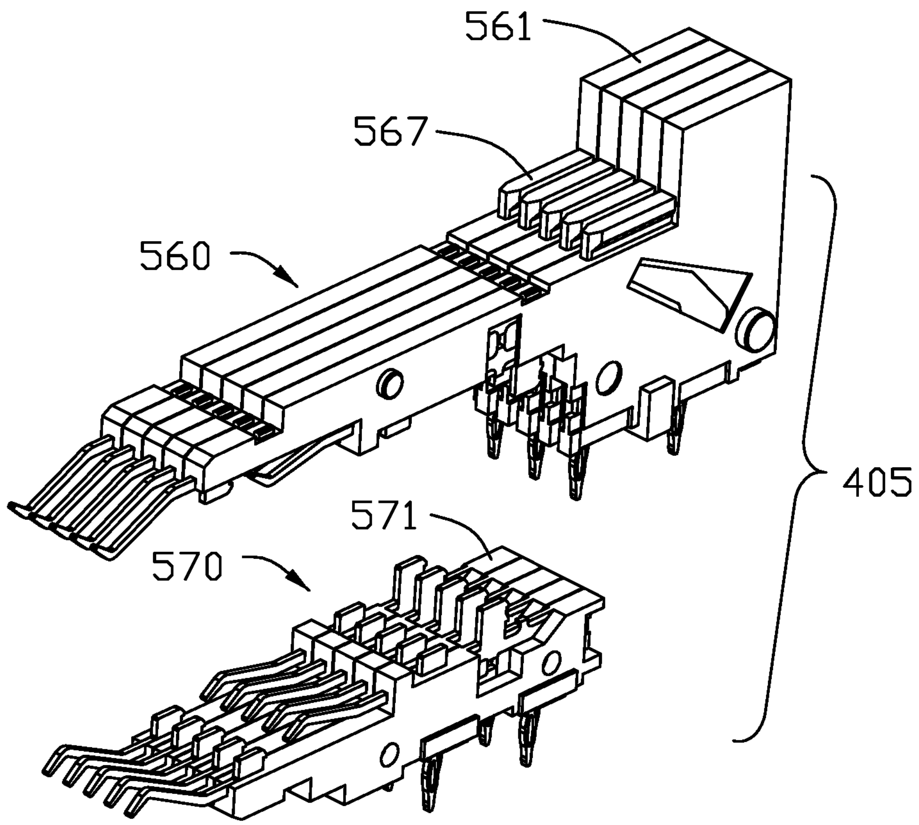
FIG. 10 is a perspective view the of the sideband contact module of the electrical connector in FIG. 7.
Figure 11:
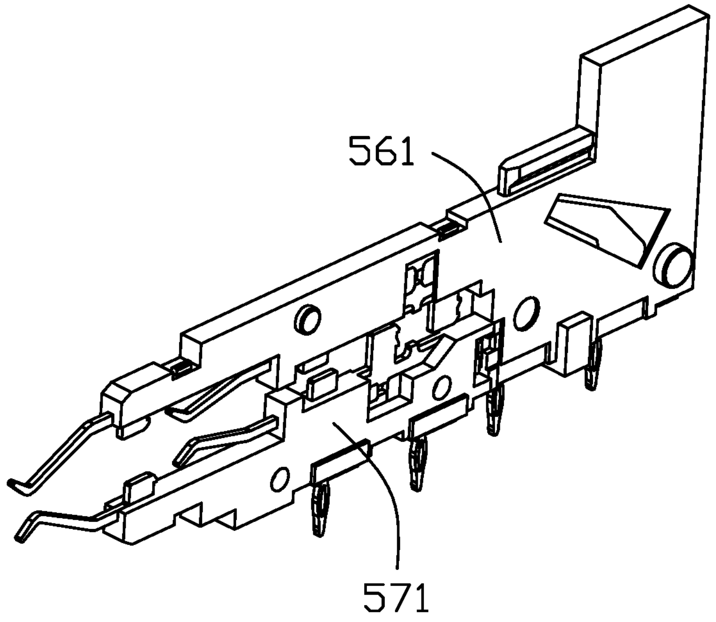
FIG. 11 is a perspective view of one sideband contact located on the upper and lower part of the sideband contact module in FIG. 10.
Figure 12:
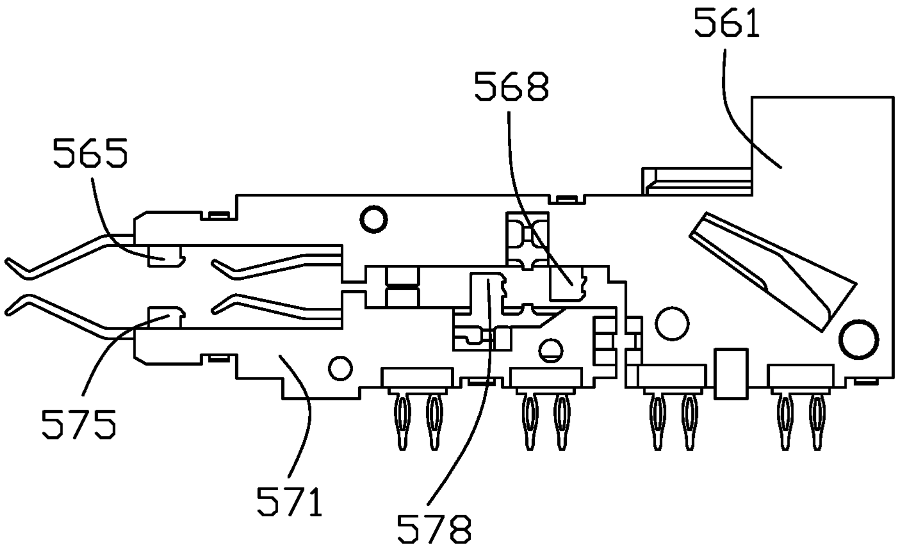
FIG. 12 is a front view of one sideband contact module located on the upper and lower part in FIG. 11.
Figure 13:
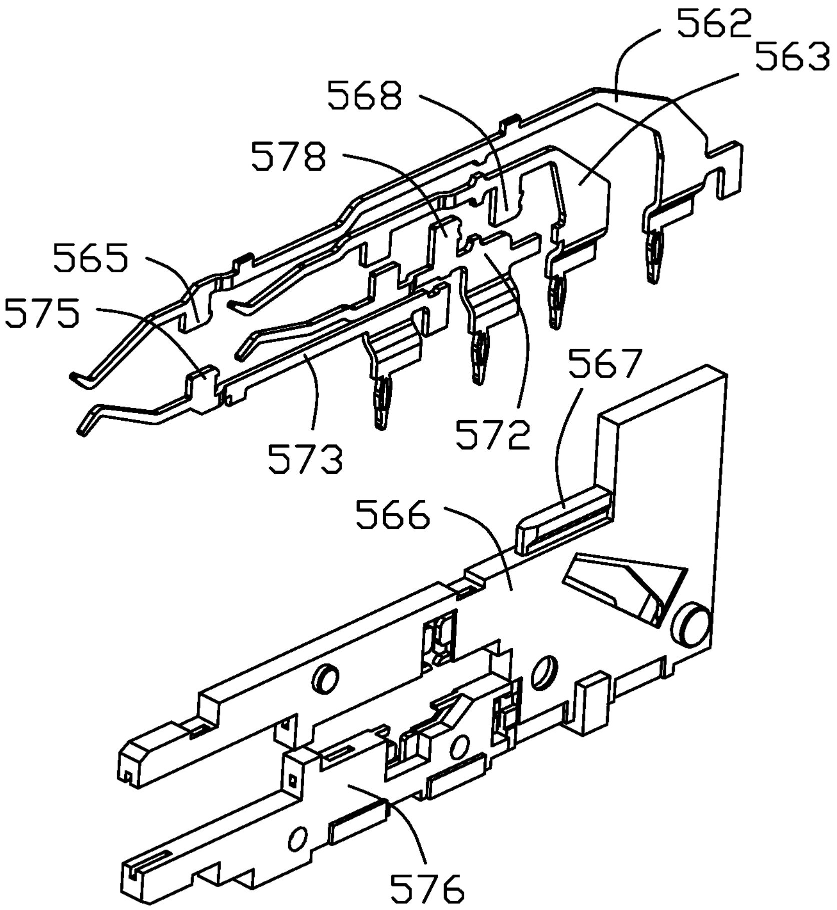
FIG. 13 is an exploded view of one sideband contact module located on the upper and lower part FIG. 12.
Figure 14:
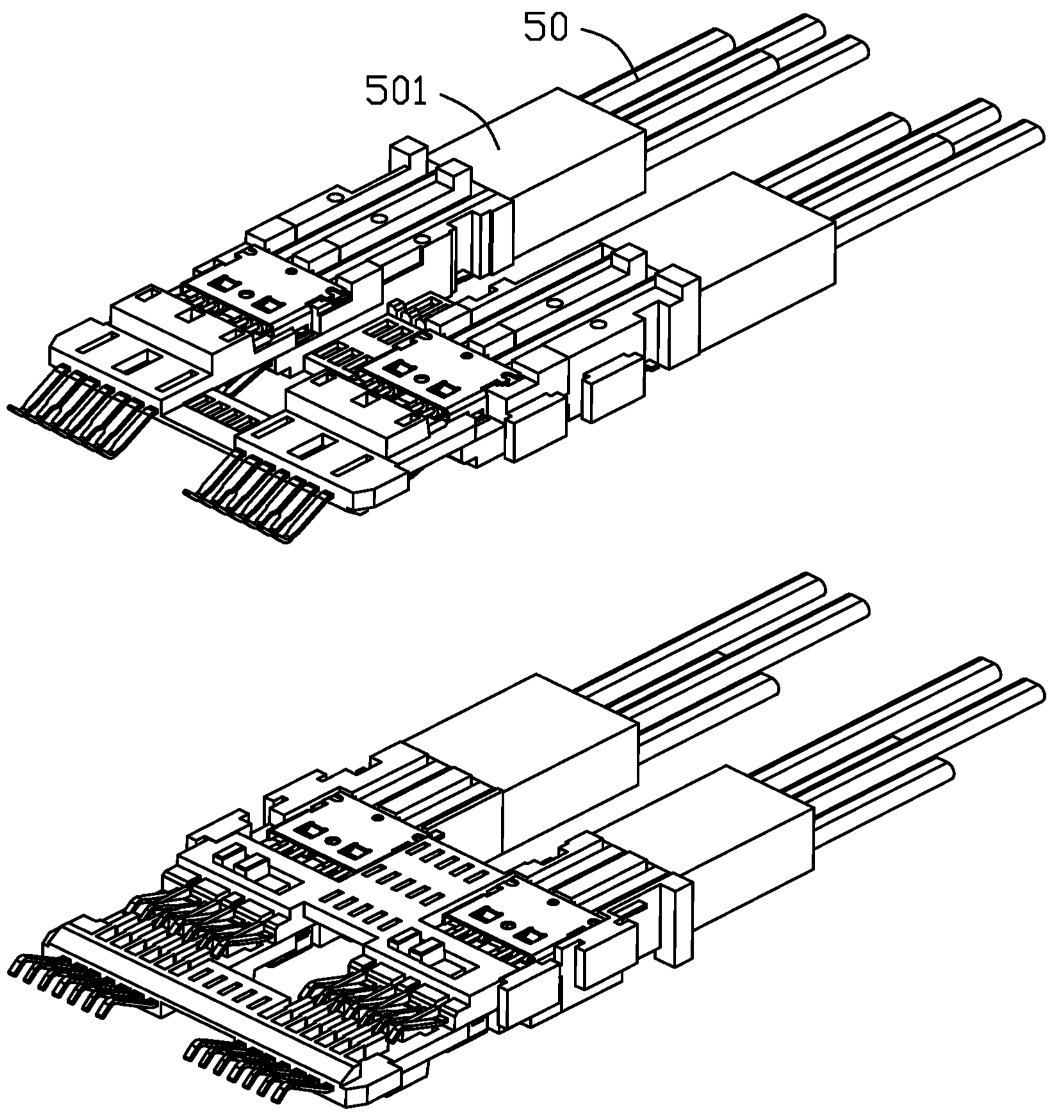
FIG. 14 is a partial exploded view of the differential pair contact module of the contact module in FIG. 7.
Figure 15:
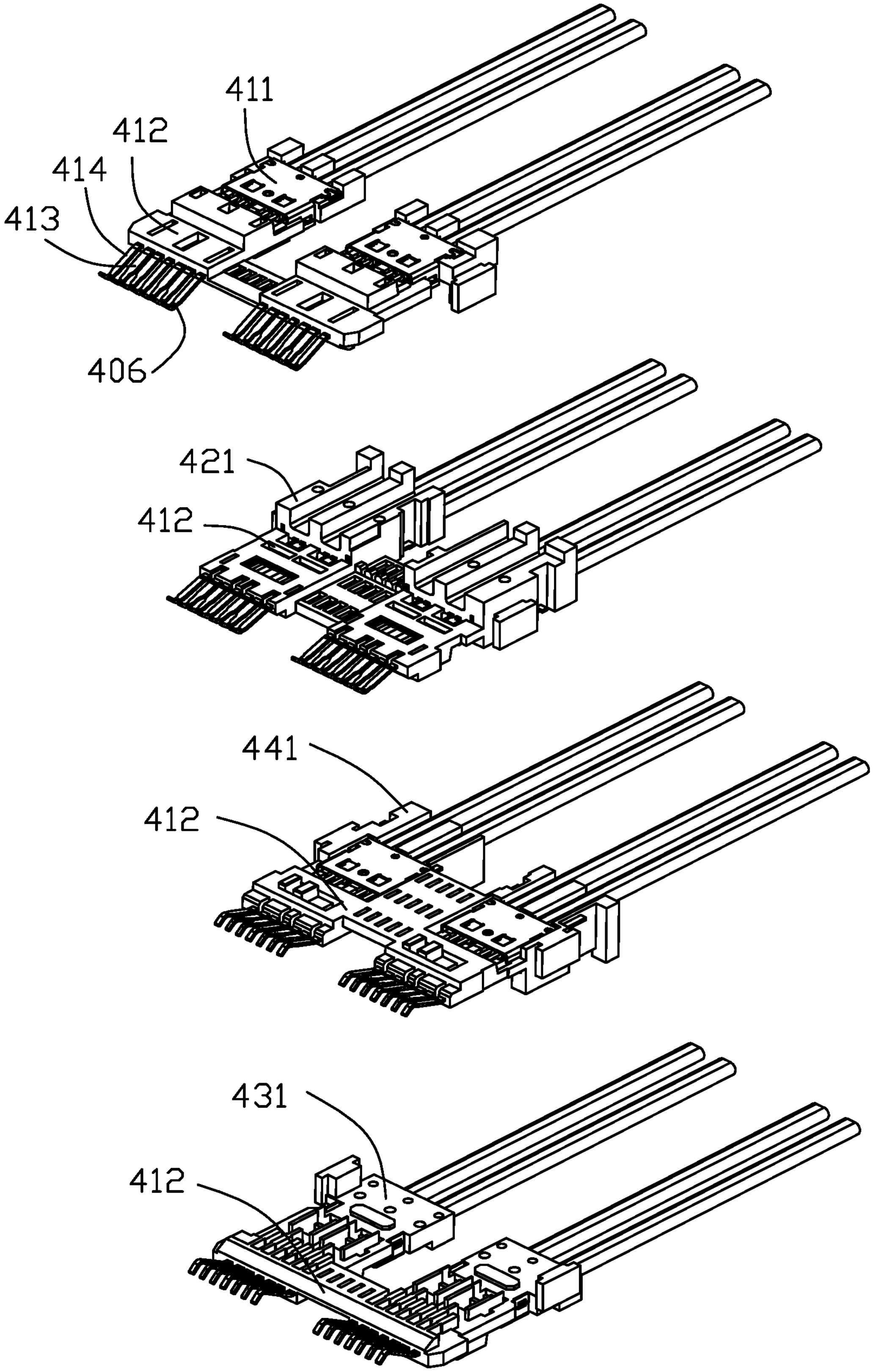
FIG. 15 is a further exploded view of the differential pair contact module in FIG. 14.
Figure 16:
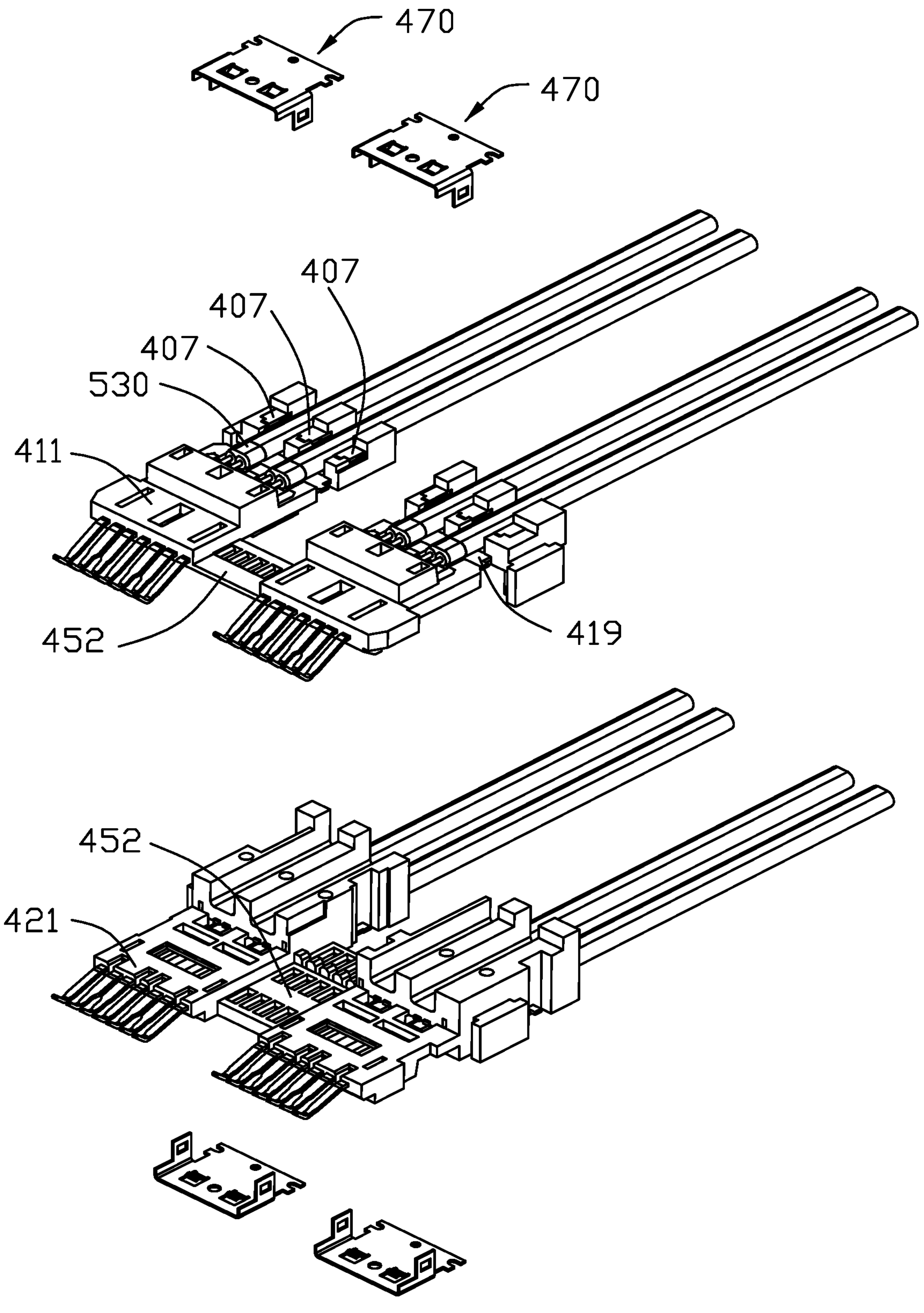
FIG. 16 is an exploded view of the upper part of the differential pair contact module in FIG. 15.
Figure 17:
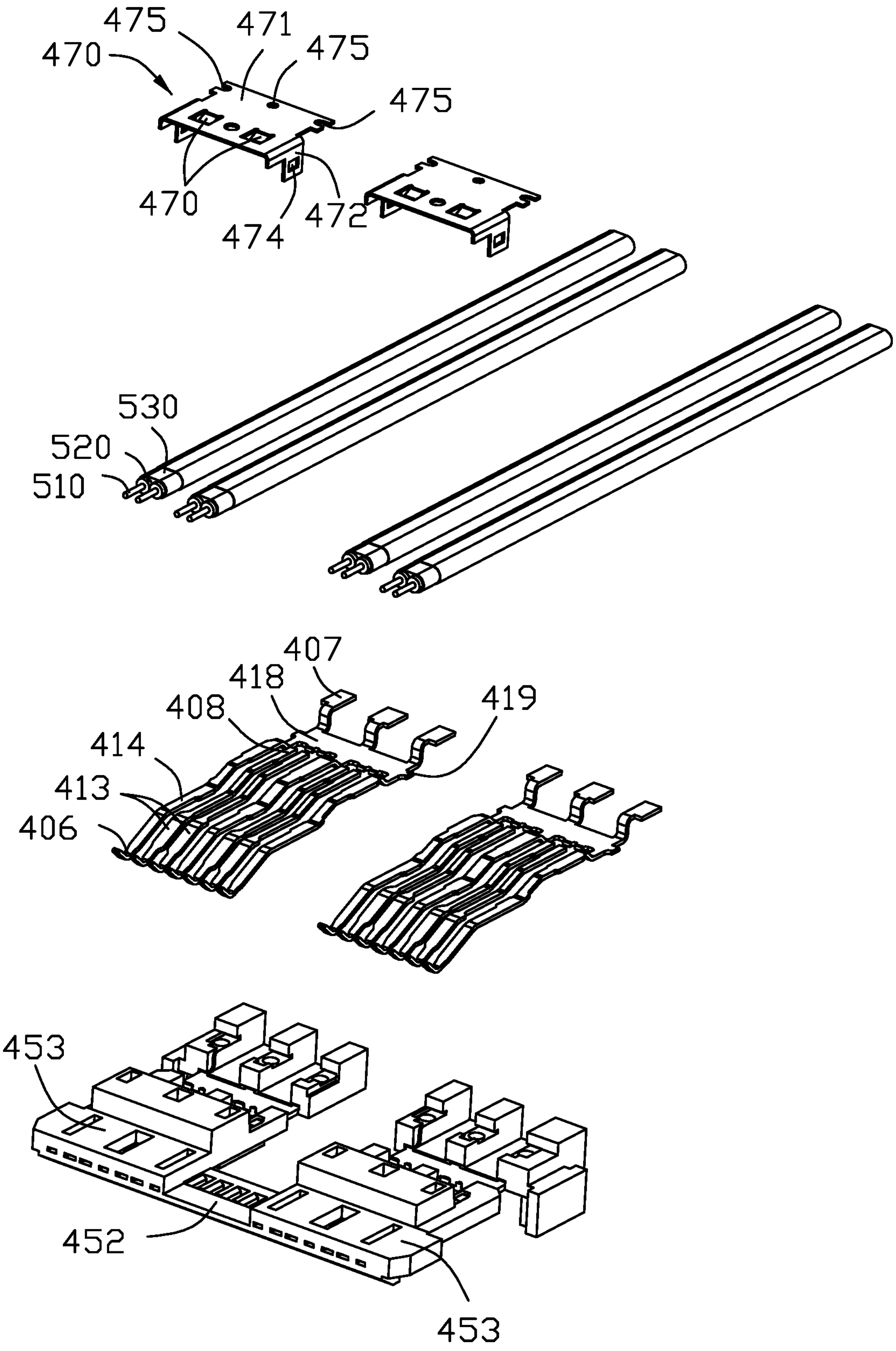
FIG. 17 is an exploded view of the first contact module of the differential pair contact module in FIG. 16.
Figure 18:
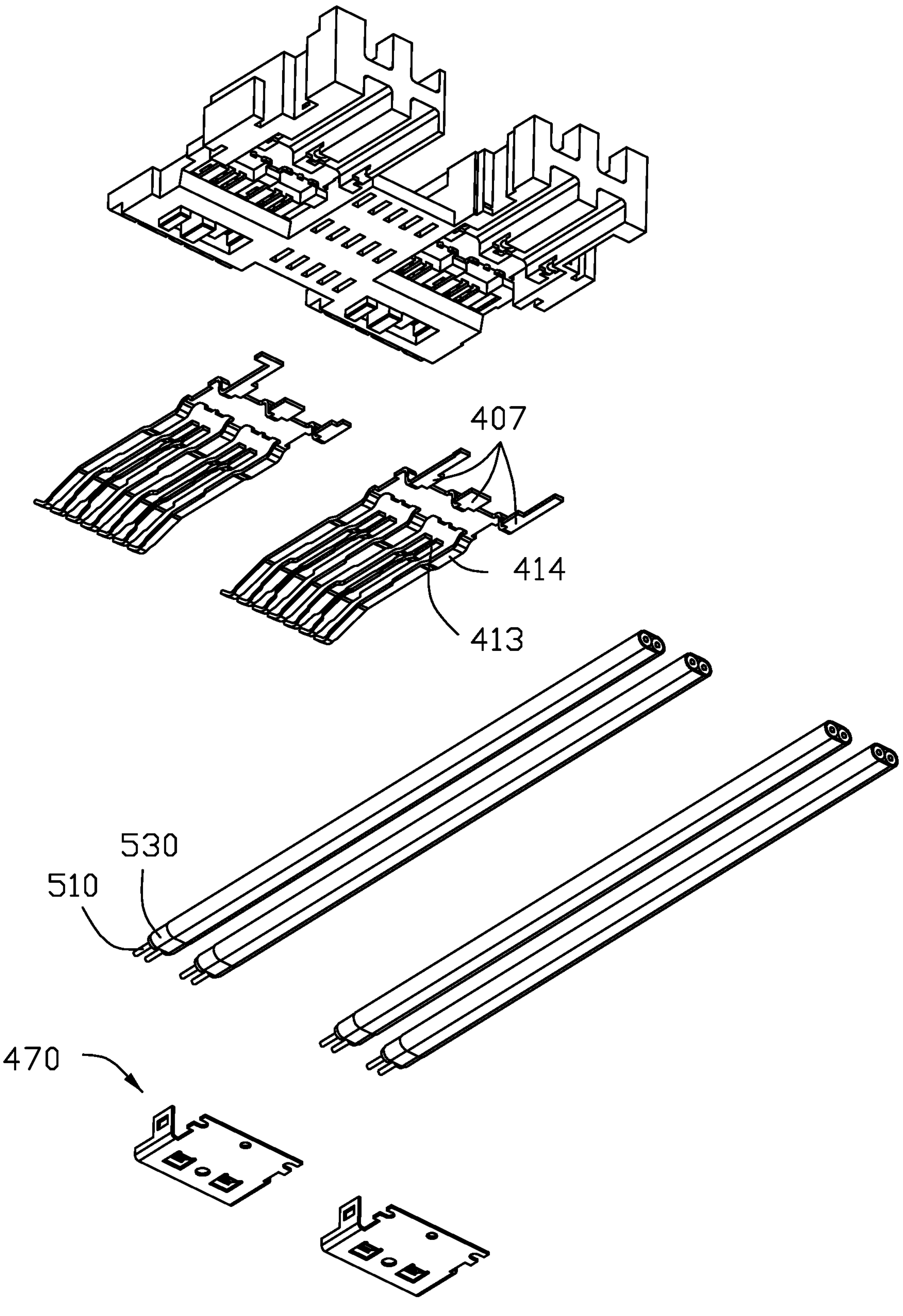
FIG. 18 is an exploded view of the second contact module of the differential pair contact module in FIG. 16.
Figure 19:
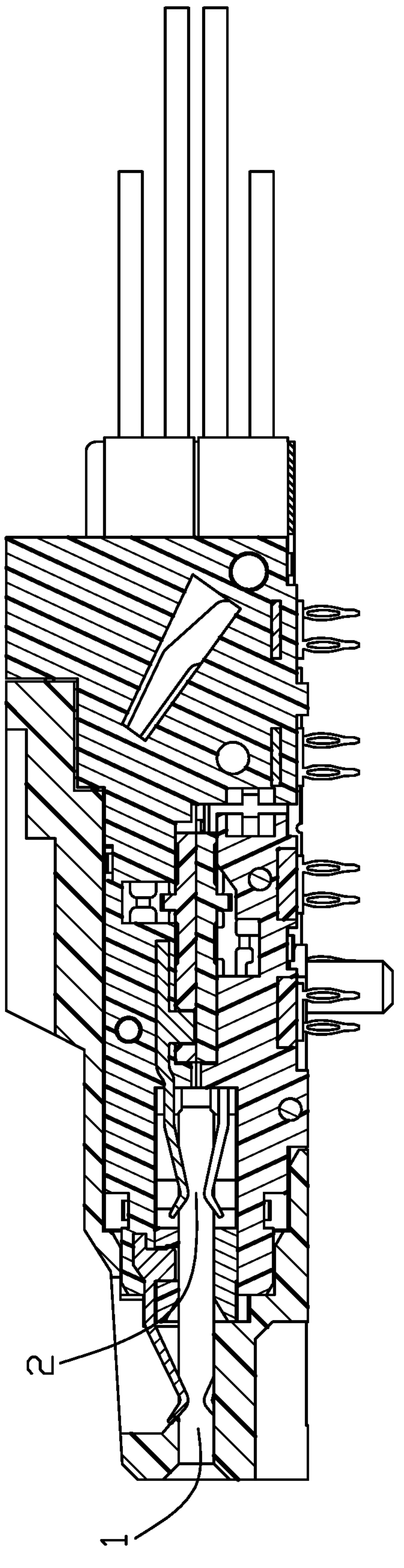
FIG. 19 is a cross-sectional view taken along line 19-19 of the electrical connector assembly in FIG. 3.

Referring to FIGS. 1-19, a receptacle assembly 900 for mounting upon a printed circuit board (not shown) and can be inserted by a mating plug module (not shown), includes a metal cage 100 enclosing therein an electrical connector assembly 200. The electrical connector assembly 200 comprises an insulative housing 30, a contact module 40 received in the insulative housing 30, and a cable 50 connected to the contact module 40 and extending out of the insulative housing 30 backwards.

The insulative housing 30 has an upper wall 31, a lower wall 32, and a pair of side walls 33 connecting the upper wall 31 and the lower wall 32. The length of the upper wall 31 extending backward is greater than that of other walls. The insulative housing 30 has a front mating slot 301 and a rear receiving space 302. The contact module 40 is accommodated in the rear receiving space 302 of the insulative housing 30 from the rear to the front. The front mating slot 301 can accommodate a mating tongue of the mating plug module.

The metal cage 100 includes a top wall 11, a bottom wall 12 parallel to the top wall 11 and a side walls 13 connecting the top wall 11, a bottom wall 12. The rear side of the bottom wall 12 of the metal housing 100 has a bottom opening 121 so that the electrical connector assembly 200 can be installed in the metal cage 100 from bottom to top. The metal cage 100 includes an accommodation space 101 with a front opening surrounded by each of the walls. The electrical connector assembly 200 is accommodated at the rear of the accommodation space 101. The accommodation space 101 of the metal cage 100 communicates with the front mating slot 301, so that the mating tongue of the mating plug module can be inserted into the front mating slot 301 from front to back to match with the electrical connector assembly 200.

The electrical connector assembly 200 and the metal cage 100 are positioned with each other in the up and down, left and right, and front and rear directions, and are fixedly connected to each other, so that they can be mounted on the circuit board together. Specifically, in the present invention, the side wall 33 of the insulative housing 30 has a holding groove 331, and the side wall 13 of the metal cage 100 has an elastic piece 131 elastically abutting against the holding groove 331. The elastic piece 131 is integrally stamped from the metal cage 100 and freely extends from bottom to top and toward the side wall 33 of the insulative housing 30. The upper end of the elastic piece 131 is abutted against the top of the holding groove 331 to position the insulative housing 30 and the metal cage 100 in the left-right direction and the downward direction. The dimension of the elastic piece 131 along the front-rear direction matches that of the holding groove 331, so as to position the insulative housing 30 and the metal cage 100 in the front-rear direction. The side wall 13 of the metal cage 100 further includes a second elastic piece 132 against the bottom surface of the rear area of the upper wall 31 of the insulative housing 30. The second elastic piece 132 and the upper wall 31 position the insulative housing 30 and the metal cage 100 in a downward direction. The top wall 11 of the metal cage 100 has a tab 111 bent downward and protruding into the accommodation space 101. The upper wall 31 of the insulative housing 30 has a gap 311 for receiving the tab 111. When the electrical connector assembly 200 and the metal cage 100 are assembled together, the bottom of the tab 111 extends downwards until it is located at the bottom of the gap 311. In the present invention, the gaps 311 are arranged as a pair, which are arranged at intervals along the transverse direction. The matching gap between the tab 111 and the corresponding gap 311 in the front and back direction is not greater than 0.05 mm. The tabs 111 and the gaps 311 cooperate with each other to position the insulative housing 30 and the metal cage 100 in the front-rear direction, left-right direction and upward direction.

The contact module 40 includes an upper part 401 and a lower part 402 stacked with each other in the vertical direction. Each of the upper part 401 and the lower part 402 include a differential pair contact module 404 and a sideband contact module 405. The differential pair contact module 404 of the upper part 401 includes a first contact module 411 and a second contact module 421 arranged under the first contact module 411. The differential pair contact module of the lower part 402 includes a third contact module 431 and a fourth contact module 441 arranged above the third contact module 431. The first contact module 411 and the second contact module 421 are stacked with each other in the vertical direction. The third contact module 431 and the fourth contact module 441 are stacked with each other in the vertical direction. Each of the first contact module 411, the second contact module 421, the third contact module 431 and the fourth contact module 441 includes a unitary insulator 412 and a plurality of conductive contacts held on the insulator 412. The conductive contacts include differential pair contacts 413 alternately arranged with ground contacts 414 in the transverse direction.

The sideband contact module 405 includes a plurality of sideband contacts 455. The sideband contact 455 and the differential pair contact 413 are held on the insulator 412 in different ways. Specifically, in the present invention, The differential pair contacts 413 and the ground contacts 414 integrally formed within the insulator 412 via insert-molding, and the sideband contacts 455 is assembled on the insulator 412. Each of the sideband contacts 455, the differential pair contact 413 and the ground contact 414 has a deflectable mating portion 406 at the front for mating with a mating connector. Each of the ground contact 414 further has a tail portion 407 mechanically and electrically connected to the corresponding cables 50, respectively. Each of the differential pair contacts 413 further has a tail portion 408 mechanically and electrically connected to the corresponding cable 50. Each of the sideband contacts 455 further has a sideband tail 409 that can be directly mounted on the printed circuit board. The contacts in the differential pair contact module 404 are narrowside-to-narrowside coupled in the transverse direction, and the side contacts of the side contact module 405 are wideside-to-wideside coupled in the transverse direction.

Based upon the similarity of the four contact modules, only the first contact module 411 is described in detail. The insulator 412 includes a middle sector 452 and a pair of side sector 453 located by two sides of the middle sector 452 in the transverse direction. The sideband contacts 455 retained in the middle sector 452, the differential pair contacts 413 and the ground contacts 414 are divided into two groups retained in the corresponding side sector 453. Each group includes two pairs of differential pair contacts 413 arranged alternately with three ground contacts 414. The tails 407 of the ground contacts 414 of each group of contacts are linked together with a transverse bar 418. The transverse bar 418 and the ground contact 414 are stamped integrally. The sideband contact module 405 includes an upper sideband sub-module 560 located in the upper part 401 and a lower sideband sub-module 570 located in the lower part 402. The upper sideband sub-module 560 includes a plurality of upper wafer 561 stacked in the transverse direction, and the lower sideband sub-module 570 includes a plurality of lower wafer 571 stacked in the transverse direction. Each of the upper wafers 561 includes an upper fixing member 566, and an upper sideband contact 562 and a lower sideband contact 563 integrally formed with the upper fixing member 566 via an insert-molding process, Each of the lower wafers 571 includes a lower fixing member 576, and an upper sideband contact 572 and a lower sideband contact 573 integrally formed with a lower fixing member 576 via an insert-molding process. In the present invention, each of the upper sideband sub-module 560 and the lower sideband sub-module 570 has five wafers. The upper wall 31 of the insulative housing 30 has a plurality of guiding grooves 316 for receiving corresponding guide ribs 567 formed on the upper fixing member 566.

The upper sideband contact 562 and the lower sideband contact 563 in the same upper fixing member 566 are jointly assembled to the three insulators 412 of the first contact module 411, the second contact module 421 and the fourth contact module 441. The upper sideband contact 572 and the lower sideband contact 573 in the same lower fixing member 576 are jointly assembled in the three insulators 412 of the second contact module 421, the third contact module 431 and the fourth contact module 441. Specifically, each the lower sideband contact 573 in the lower fixing member 576 has an insert piece 575 installed upwardly in the insulator 412 of the third contact module 431, and each of the upper sideband contact 572 has an insert piece 578 installed upwardly in the insulator 412 of the fourth contact module 441 and the second contact module 421. Each of the upper sideband contacts 562 in the upper fixing member 566 has an insert piece 565 assembled downwardly in the insulator 412 of the first contact module 411, and each of the lower sideband contacts 563 has an inserting piece 568 installed downwardly in the insulator 412 of the second contact module 421 and the fourth contact module 441.

The deflectable mating portion 406 of the differential pair contact 413 of the first contact module 411 is located in front of the mating portion 406 of the differential pair contact 413 of the second contact module 421. The deflectable mating portion 406 of the differential pair contact 413 of the third contact module 431 is located in front of the mating portion 406 of the differential pair contact 413 of the fourth contact module 441. The front mating portion 406 of the contacts of the first contact module 411 and the third contact module 431 are located on the upper and lower sides of the front mating slot 301 to form a first matching area 1. The front mating portion 406 of the contact of the fourth contact module 441 and the second contact module 421 forms a second matching area 2 at the rear of the first matching area 1. The mating portions 406 of the upper sideband contacts 562 of the upper part 401 is aligned with the mating portions 406 of the conductive contacts of the first contact module 411 in the transverse direction, and the mating portions 406 of the lower sideband contacts 563 of the upper part 401 is aligned with the mating portions 406 of the conductive contacts of the second contact module 421 in the transverse direction. Similarly, the mating portions 406 of the upper sideband contacts 572 of the lower part is aligned with the mating portions 406 of the conductive contacts of the fourth contact module 441 in the transverse direction, the mating portions 406 of the lower sideband contacts 573 of the lower part 402 is aligned with the mating portions 406 of the conductive contacts of the third contact module 431 in the transverse direction. Two rows of channels 119 are provided on the upper and lower sides of the front mating slot 301 of the insulative housing 30. The mating portion 406 of the first contact module 411 and the third contact module 431 can be respectively deflected into the corresponding channel 119. Each of the side walls 33 of the insulative housing 30 have grooves 333 on opposite side. The insulator 412 has protrusions 403 matching with the groove 333.

The contact module 40 further comprises a metallic shell 460 fixing the upper part 401 and the lower part 402 together, so that the contact module 40 is integrally assembled into the insulative housing 30. The metallic shell 460 includes two sidewalls 461 and a bottom wall 462 connected to the rear thereof. The side walls 461 has a plurality of elastic piece 464 protruding outward for engaging with the insulative housing 30, a plurality of tabs 466 extending upward, and mounting legs 465 extending downward for mounting on the printed circuit board. A space 467 is formed between adjacent tabs 466. The outer side walls 33 of each insulator 412 have a plurality of fixing blocks 415 arranged at intervals and protruding outward. An installation gap 416 is formed between the fixing block 415 and the outer side wall of the insulator 412. The fixing block 415 is received in the corresponding space 467. The tab 466 is fixed in the installation gap 416. The fixing blocks 415 of the first contact module 411 and the third contact module 431 are vertically aligned to be accommodated in the same space 467. The fixing blocks 415 of the second contact module 421 and the fourth contact module 441 are vertically aligned and to be accommodated in the same space 467. The upper sideband contacts 562 can be installed on the circuit board through the opening 468 formed on the bottom wall 462 of the metallic shell 460. The two outermost upper fixing members 566 of the sideband contact module 405 are positioned on the corresponding sides of the opening 468 in the transverse direction. The elastic piece 464 is received in the corresponding coupling groove 334 of the insulative housing 30 to hold the contact module 40 in the insulative housing 30. The metallic shell 460 is a one-piece, formed by stamping and bending.

The electrical connector assembly 200 further includes a forming block 501 for fixing the cables 50 on the corresponding sides of the first contact module 411, the second contact module 421, the third contact module 431, and the fourth contact module 441 into one body. The forming block 501 is integrally formed on the corresponding side of the cable 50 via insert-molding.

The contact module 40 further equipped with a metal grounding member 470. Based upon the similarity of the metal grounding member 470 of the four contact modules, only the first contact module 411 is described in detail. The tail portion 407 of the ground contact 414 and the tail portion 408 of the differential pair contact 413 are staggered in the vertical direction and the front-back direction, so as to be connected to the metal grounding member. Specifically, in the present invention, the metal ground member 470 includes a flat portion 471 and a pair of arms 472 extending from two sides of the flat portion 471. The cable 50 includes a pair of inner conductors 510, a pair of inner insulative layer 520, and a common metal shielding layer 530. The cable 50 is sandwiched between the transverse bar 418 of the ground contact 414 and the flat portion 471 in the vertical direction. The differential pair contact 413 and the transverse bar 418 are located on the same side of the cable 50 in the vertical direction. The flat portion 471 covers the exposed area of the metal shielding layer 530. The transverse bar 418 has protrusions 419 at two sides protruding outward and extending into the opening 474 of the connecting wall 472. The tail portion 407 of the ground contact 414 extends backward beyond the tail portion 408 of the differential pair contact 413, and the tail portion 407 of the ground contact 414 extends in the vertical direction to mechanically contact with the flat plate portion 471. The flat portion 471 has an opening 475 and an elastic piece 476 integrally formed from the flat part. The opening 475 is aligned with the tail portion 407 of the corresponding ground contact 414 in the vertical direction, and the metal ground member 470 is directly soldered to the tail portion 407 of the ground contact 414 through the opening 475. The elastic piece 476 elastically abuts against the metal shielding layer 530 to form a mechanical and electrical connection therebetween. The metal ground member 470 connects the metal shielding layer 530 and the ground contact 414, which has better anti-interference and grounding effects, and improves the signal transmission rate of the connector assembly.

A method of making the electrical connector assembly 200 comprises the steps of: providing the insulative housing 30 having a front mating slot 301 and a rear receiving space 302 for receiving the contact module 40; providing the differential pair contact 413; molding the insulator 412 with the differential pair contact 413 to form the differential pair contact module 404; providing the sideband contact 455, and assemble the sideband contact 455 in the insulator 451 to form the upper part 401; providing the lower part 402 corresponding to the upper part 401; stacking the upper part 401 and the lower part 402 in the vertical direction to form the contact module 40; and assembling the contact module 40 into the insulative housing 30 to form the electrical connector assembly 200.

In the electrical connector assembly 200 of the present invention, the differential pair contacts and the sideband contacts are held in the insulator 412 in different ways, which is convenient for production and manufacture, and the contact module is fixed in one body in the transverse direction through the insulator 412, making the structure more firm and stable.

In the electrical connector assembly of the present invention, the electrical connector assembly 200 fixes the contact module 40 as a whole through the metallic shell 460, so that the structure of the electrical connector assembly 200 is more compact, and the assembly is simple and convenient.

In the electrical connector assembly of the present invention, the electrical connector assembly and the metal cage are fixedly connected so that they can be installed on the circuit board together.

In the electrical connector assembly of the present invention, the tail portion of the ground contacts and the tail portion of the differential pair contact are staggered in the vertical direction and in the front-back direction, so that the ground contact is connected to the metal grounding member.

The electrical connector assembly 200 of the present invention conforms to the specification of QSFP-DD, which defines eight transmitting channels and eight receiving channels, The signal transmission rate of each channel can reach 50 Gbps or above. Of course, the present invention can also be applied to high-speed electrical connectors such as SFP-DD, SFP, OSFP, etc.

The invention claimed is:

1. An electrical connector assembly comprising:

an insulative housing forming a front mating slot and a rear receiving space;

a contact module received in the insulative housing and including an upper part and a lower part stacked with each other, each of the upper part and the lower part comprising a differential pair contact module having an insulator and a plurality of differential pair contacts fixed in the insulator, each of the differential pair contacts having a mating portion and a tail portion opposite to the mating portion;

a cable connected to the contact module, the differential pair contacts being mechanically and electrically connected to the cable; and a sideband contact module comprising sideband contacts; wherein the differential pair contacts and the sideband contacts are fixed to the insulator in different ways;

the differential pair contact is integrally formed with the insulator via insert-molding, and the sideband contact is assembled on the insulator;

the sideband contacts are retained in a middle sector of the insulator, the differential pair contacts are retained in two sides of the sideband contact in a transverse direction, and the insulator fixes the differential pair contacts on the two sides as a whole;

the differential pair contact module of the upper part includes a first contact module and a second contact module under the first contact module, the differential pair contact module of the lower part includes a third contact module and a fourth contact module above the third contact module, the front mating portions of the contacts of the first contact module and the third contact module are located on the upper and lower sides of the front mating slot to form a first matching area, the front mating portions of the contacts of the fourth contact module and the second contact module form a second matching area; and the sideband contact module includes an upper sideband sub-module at the upper part and a lower sideband sub-module at the lower part, each of the upper sideband sub-module and the lower sideband sub-module includes a plurality of wafers stacked in the transverse direction, and each of the wafers includes a fixing member and two sideband contacts integrally formed within the fixing member via an insert-molding process.

2. The electrical connector assembly as claimed in claim 1, wherein an upper wall of the insulative housing has a plurality of guiding grooves for receiving corresponding guide ribs on the fixing members.

3. The electrical connector assembly as claimed in claim 1, wherein each of the first contact module, the second contact module, the third contact module, and the fourth contact module includes a unitary insulator and a differential pair contact integrally formed with the insulator via insert-molding, the two sideband contacts in the same fixing member of the upper part are assembled to the three insulators of the first contact module, the second contact module, and the fourth contact module, the two sideband contacts in the same fixing member of the lower part are jointly assembled in the three insulators of the third contact module, the fourth contact module, and the second contact module.

4. The electrical connector assembly as claimed in claim 3, wherein at least one of the sideband contacts of the lower part is installed upwardly in the insulators of the fourth contact module and the second contact module, at least one of the sideband contacts of the upper part is installed downwardly in the insulators of the second contact module and the fourth contact module.

5. The electrical connector assembly as claimed in claim 1, further including a metallic shell fixing the first contact module, the second contact module, the third contact module, and the fourth contact module as a whole.

6. The electrical connector assembly as claimed in claim 5, wherein the sideband contact extends through an opening formed on a bottom wall of the metallic shell, and two outermost fixing members of the upper part are positioned on two sides of the opening in the transverse direction.

7. The electrical connector assembly as claimed in claim 5, wherein the metallic shell has a number of elastic pieces protruding outwardly for engaging with the insulative housing and a number of mounting legs.

8. The electrical connector assembly as claimed in claim 1, further comprising a metal grounding member, and wherein the differential pair contact module includes ground contacts arranged alternately with the differential pair contacts in the transverse direction, each of the ground contacts has a mating portion and a tail portion, and the tail of the ground contact and the differential pair contact are staggered in an up-down direction and in a front-back direction.

9. The electrical connector assembly as claimed in claim 8, wherein the tail portion of the ground contact extends backward beyond the tail portion of the differential pair contact, and the tail portion of the ground contact extends toward the metal grounding member beyond the tail portion of the differential pair contact.

10. The electrical connector assembly as claimed in claim 8, wherein the cable includes a pair of inner conductors, a pair of inner insulative layer, and a common metal shielding layer, the inner conductors is mechanically and electrically connected to the corresponding differential pair contacts, and the metal shielding layer is mechanically and electrically connected to the metal grounding member.

11. The electrical connector assembly as claimed in claim 10, wherein the ground contacts are linked together by a transverse bar extending in the transverse direction, and the cable is sandwiched between the transverse bar and the metal grounding member.

12. The electrical connector assembly as claimed in claim 11, wherein the metal ground member includes a flat portion covering an exposed area of the metal shielding layer, and a pair of arms extend from two transverse sides of the flat portion and connected with the transverse bar.

13. The electrical connector assembly as claimed in claim 12, wherein the flat portion has an opening and an elastic piece integrally formed with the flat portion, the elastic piece elastically abuts against the metal shielding layer, and the metal grounding member is soldered to the tail portion of the grounding contact through the opening.

14. The electrical connector assembly as claimed in claim 1, further including a metal cage.

15. An electrical connector assembly comprising:

an insulative housing forming a front mating slot and a rear receiving space;

a contact module received in the insulative housing and including an upper part and a lower part stacked with each other, each of the upper part and the lower part comprising a differential pair contact module having an insulator and a plurality of differential pair contacts fixed in the insulator, each of the differential pair contacts having a mating portion and a tail portion opposite to the mating portion;

a cable connected to the contact module, the differential pair contacts being mechanically and electrically connected to the cable;

a metallic shell; and a sideband contact module comprising sideband contacts; wherein the differential pair contacts and the sideband contacts are fixed to the insulator in different ways;

the differential pair contact is integrally formed with the insulator via insert-molding, and the sideband contact is assembled on the insulator;

the sideband contacts are retained in a middle sector of the insulator, the differential pair contacts are retained in two sides of the sideband contact in a transverse direction, and the insulator fixes the differential pair contacts on the two sides as a whole;

the differential pair contact module of the upper part includes a first contact module and a second contact module under the first contact module, the differential pair contact module of the lower part includes a third contact module and a fourth contact module above the third contact module, the front mating portions of the contacts of the first contact module and the third contact module are located on the upper and lower sides of the front mating slot to form a first matching area, the front mating portions of the contacts of the fourth contact module and the second contact module form a second matching area;

the metallic shell fixes the first contact module, the second contact module, the third contact module, and the fourth contact module as a whole; and the sideband contact extends through an opening formed on a bottom wall of the metallic shell, and two outermost fixing members of the upper part are positioned on two sides of the opening in the transverse direction.

16. An electrical connector assembly comprising:

an insulative housing forming a front mating slot and a rear receiving space;

a contact module received in the insulative housing and including an upper part and a lower part stacked with each other, each of the upper part and the lower part comprising a differential pair contact module having an insulator and a plurality of differential pair contacts fixed in the insulator, each of the differential pair contacts having a mating portion and a tail portion opposite to the mating portion;

a cable connected to the contact module, the differential pair contacts being mechanically and electrically connected to the cable;

a metal grounding member; and a sideband contact module comprising sideband contacts; wherein the differential pair contacts and the sideband contacts are fixed to the insulator in different ways;

the differential pair contact is integrally formed with the insulator via insert-molding, and the sideband contact is assembled on the insulator;

the sideband contacts are retained in a middle sector of the insulator, the differential pair contacts are retained in two sides of the sideband contact in a transverse direction, and the insulator fixes the differential pair contacts on the two sides as a whole;

the differential pair contact module includes ground contacts arranged alternately with the differential pair contacts in the transverse direction, each of the ground contacts has a mating portion and a tail portion, and the tail of the ground contact and the differential pair contact are staggered in an up-down direction and in a front-back direction;

the cable includes a pair of inner conductors, a pair of inner insulative layer, and a common metal shielding layer, the inner conductors is mechanically and electrically connected to the corresponding differential pair contacts, and the metal shielding layer is mechanically and electrically connected to the metal grounding member;

the ground contacts are linked together by a transverse bar extending in the transverse direction, and the cable is sandwiched between the transverse bar and the metal grounding member;

the metal ground member includes a flat portion covering an exposed area of the metal shielding layer, and a pair of arms extend from two transverse sides of the flat portion and connected with the transverse bar; and the flat portion has an opening and an elastic piece integrally formed with the flat portion, the elastic piece elastically abuts against the metal shielding layer, and the metal grounding member is soldered to the tail portion of the grounding contact through the opening.

* * * * *